(12) United States Patent
Obla et al.

(10) Patent No.: US 12,063,340 B2
(45) Date of Patent: Aug. 13, 2024

(54) MULTI-APERTURE RANGING DEVICES AND METHODS

(71) Applicant: OWL AUTONOMOUS IMAGING, INC., Fairport, NY (US)

(72) Inventors: Srinath Obla, Rochester, NY (US); Eugene M. Petilli, Victor, NY (US); Akash Chintha, Rochester, NY (US); Charles F. Gershman, Pleasanton, CA (US); Francis J. Cusack, Jr., Wilmington, NC (US)

(73) Assignee: Owl Autonomous Imaging, Inc., Fairport, NY (US)

( * ) Notice: Subject to any disclaimer, the term of this patent is extended or adjusted under 35 U.S.C. 154(b) by 119 days.

(21) Appl. No.: 17/976,619

(22) Filed: Oct. 28, 2022

(65) Prior Publication Data

US 2023/0048140 A1 Feb. 16, 2023

Related U.S. Application Data

(63) Continuation of application No. 17/397,935, filed on Aug. 9, 2021, now Pat. No. 11,490,067.
(Continued)

(51) Int. Cl.
*H04N 13/243* (2018.01)
*G06T 7/593* (2017.01)
(Continued)

(52) U.S. Cl.
CPC .......... *H04N 13/243* (2018.05); *G06T 7/593* (2017.01); *H04N 13/178* (2018.05); *H04N 13/25* (2018.05);
(Continued)

(58) Field of Classification Search
CPC .... H04N 13/243; H04N 13/178; H04N 13/25; H04N 13/296; H04N 23/957;
(Continued)

(56) References Cited

U.S. PATENT DOCUMENTS

| 10,664,953 B1 | 5/2020 | Lanman et al. |
| 2015/0156478 A1* | 6/2015 | Ono ..................... G02B 3/0043 348/49 |

(Continued)

OTHER PUBLICATIONS

Bello Gonzalez, Juan Luis et al. "A Novel Monocular Disparity Estimation Network With Domain Transformation and Ambiguity Learning", Korea Advanced Institute of Science and Technology (KAIST), Mar. 20, 2019, 5 pgs.
(Continued)

*Primary Examiner* — Susan E. Torgerson
(74) *Attorney, Agent, or Firm* — LOZA & LOZA LLP

(57) ABSTRACT

Embodiments of systems and methods for multi-aperture ranging are disclosed. An embodiment of an image processing system includes at least one processor and memory configured to receive a multi-aperture image set that includes a high-resolution subaperture image and a low-resolution subaperture image, wherein the high-resolution subaperture image and the low-resolution subaperture image were captured simultaneously from a camera using dissimilar focal lengths, predict a high-resolution predicted disparity map from the high-resolution subaperture image using a neural network, predict a low-resolution predicted disparity map from the low-resolution subaperture image using the neural network, and generate an integrated range map from the high-resolution and low-resolution predicted disparity maps, wherein the integrated range map includes an array of range information that corresponds to the multi-aperture image set and that is generated by overlaying common
(Continued)

points in both the high-resolution predicted disparity map and the low-resolution predicted disparity map.

16 Claims, 9 Drawing Sheets

Related U.S. Application Data

(60) Provisional application No. 63/063,141, filed on Aug. 7, 2020.

(51) Int. Cl.
*H04N 13/178* (2018.01)
*H04N 13/25* (2018.01)
*H04N 13/296* (2018.01)
*H04N 23/957* (2023.01)
*H04N 13/00* (2018.01)

(52) U.S. Cl.
CPC ......... *H04N 13/296* (2018.05); *H04N 23/957* (2023.01); *G06T 2207/10012* (2013.01); *G06T 2207/20081* (2013.01); *G06T 2207/20084* (2013.01); *H04N 2013/0081* (2013.01)

(58) Field of Classification Search
CPC ......... H04N 2013/0081; H04N 13/236; H04N 23/951; H04N 2013/0088; H04N 13/232; H04N 5/2226; G06T 7/593; G06T 2207/10012; G06T 2207/20081; G06T 2207/20084; G06T 2207/10028; G06T 2207/10052; G06T 2207/20076; G06T 7/557
USPC ........................................................... 348/48
See application file for complete search history.

(56) References Cited

U.S. PATENT DOCUMENTS

2015/0156748 A1    6/2015  Lin et al.
2018/0144492 A1*   5/2018  Vandame .......... H01L 27/14627
2019/0295264 A1*   9/2019  Petilli .................... G06T 7/285
2020/0090306 A1    3/2020  Cho et al.

OTHER PUBLICATIONS

Godard, Clément et al. "Digging Into Self-Supervised Monocular Depth Estimation", Aug. 17, 2019, 18 pgs.
Kuznietsov, Yevhen et al. "Semi-Supervised Deep Learning for Monocular Depth Map Prediction", May 9, 2017, 14 pgs.
Tang, Xiaojiao et al. "An Unsupervised Monocular Image Depth Prediction Algorithm Based on Multiple Loss Deep Learning", IEEE Access, vol. 7, (2019), pp. 162405-162414.
Wang, Huai-Mu et al. "Object Detection and Depth Estimation Approach Based on Deep Convolutional Neural Networks", Sensors (2021), 17 pgs.
Yang, Delong et al. "Unsupervised learning of depth estimation, camera motion prediction and dynamic object localization from video", International Journal of Advanced Robotic Systems, Mar.-Apr. 2020, 14 pgs.
Zhao, Chaoqiang et al. "Monocular Depth Estimation Based on Deep Learning: An Overview", Jul. 3, 2020, 14 pgs.

\* cited by examiner

MULTI-APERTURE RANGING DEVICES AND METHODS

FIELD

This invention relates generally to an image data processing system, and more particularly to prediction of range and depth data from multi-aperture image data using a trained statistical model.

BACKGROUND

Range and depth estimation from still images and video have a long history in computer vision. Video or temporal-based approaches include "structure from motion" and "depth from motion parallax" and can come in the form of multiple viewpoints taken at different times. However, most of these techniques rely on the assumption that multiple observations of the scene of interest are available over the period necessary to capture images offering perspectives different enough to support meaningful range data generation. Furthermore, unwanted changes embedded in the image data introduced over time such as camera mechanical jitter and camera attitude variability are capricious in frequency and severity and therefore difficult to predict and rectify.

Static image-based approaches include binocular stereo and multi-view stereo, and while able to derive depth at a single instance in time, require two or more cameras separated by some distance to produce parallax. Furthermore, range and depth data can only be derived for points that exist in the overlapping regions of two or more cameras' fields of view, resulting in depth data being available for only a subset of any one camera's total field of view.

Multi-aperture approaches such as plenoptic configurations V1.0 and V2.0 offer the potential for several, if not many, image pairs from which to derive range data and the diversity and redundancy of parallax data can be exploited to improve the confidence and accuracy of the resulting depth data. However, while multi-aperture approaches are able to produce rich depth data at a single instance in time, as in stereo and multi-stereo approaches, the available depth data is restricted to the regions of overlap between two or more subaperture images containing parallax to a common point in the scene. This dependency of field-of-view overlap is acutely realized when examining the minimum range at which these systems can produce range data, as the fields of view will not overlap until a minimum range is reached, the minimum ranging being a function of the cameras' focal lengths and baseline. Therefore stereo, multi-view stereo, and multi-aperture systems are typically blind to range in the near field.

To overcome these limitations, there has recently been a surge in the number of works attempting to address monocular depth estimation using a single camera producing a single depth image. For example, solutions include techniques for self-supervised monocular depth estimation as discussed in C. Godard et al., "Digging Into Self-Supervised Monocular Depth Estimation", and techniques that involve semi-supervised learning for monocular depth estimation as discussed in Y. Kuznietsov et al., "Semi-Supervised Deep Learning for Monocular Depth Map Prediction."

However, the techniques described in such works attempt to directly predict the depth of each pixel in the field of view based on a singular input image and rely on models trained offline on large collections of ground-truth image and depth data, where none of the ground truth data originates in the type of monocular system that will ingest the ground truth data. It is noted that during inference these semi-supervised and supervised approaches merely predict depth and range data from a single image, and there exists no physics-based calculation to augment or corroborate the analytic predictions. Thus, the efficacy of such methods is limited by the degree to which input scenes during inference possess content substantially similar to that within collections of the ground truth data.

SUMMARY

Figure 1:
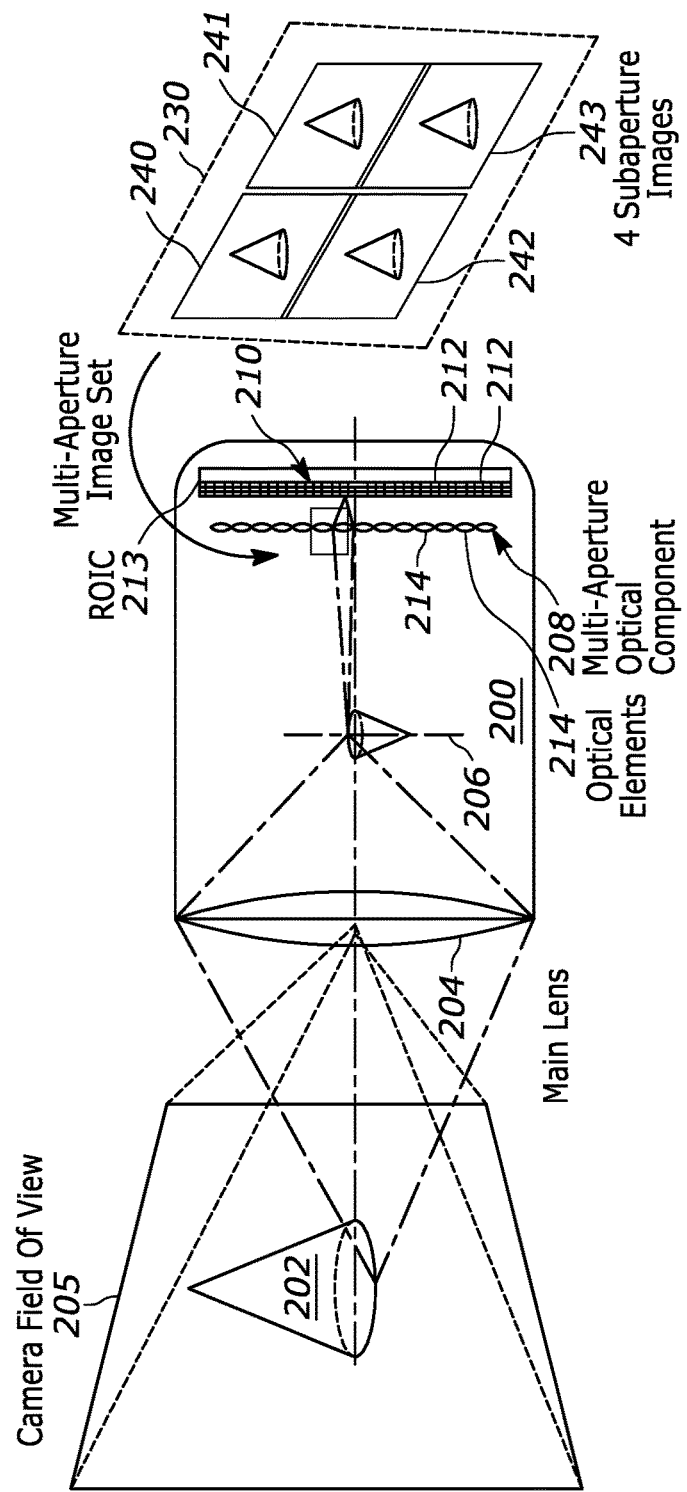
FIG. 1 depicts a simplified schematic illustration of an example of a plenoptic camera, wherein the plenoptic camera produces a multi-aperture image comprised of subaperture images, wherein disparity exists between two or more subaperture images.

Embodiments of systems and methods for multi-aperture ranging are disclosed. An embodiment of a device includes a main lens, configured to receive an image from the field of view of the main lens, a multi-aperture optical component having optical elements optically coupled to the main lens and configured to create a multi-aperture image set that includes a plurality of subaperture images, wherein at least one point in the field of view is captured by at least two of the subaperture images, an array of sensing elements, the array of sensing elements being optically coupled to the multi-aperture optical component and configured to generate signals that correspond to the at least two subaperture images, a read-out integrated circuit (ROIC) communicatively coupled to the array of sensing elements and configured to receive the signals, which correspond to the at least two subaperture images, from the array of sensing elements, to convert the signals to digital data, and to output the digital data, and an image processing system, responsive to the digital data that is output from the ROIC, which is configured to generate disparity values that correspond to at least one point in common between the at least two subaperture images.

In an embodiment, the multi-aperture optical component includes a two-dimensional microlens array configured to create at least two subaperture images in the multi-aperture image set that are formed by the two-dimensional microlens array, and wherein the image processing system includes a convolutional neural network (CNN) module that is configured to both compute disparity between the two subaperture images and predict disparity of at least one of the two subaperture images.

In an embodiment, the multi-aperture optical component includes optical elements of dissimilar focal lengths configured to create at least two subaperture images in the multi-aperture image set that are formed by the optical elements of dissimilar focal lengths, and wherein the image processing system includes a convolutional neural network (CNN) module that is trained using a predicted disparity error that corresponds to an error between disparity maps generated from the at least two subaperture images.

In an embodiment, the at least two subaperture images include a first subaperture image generated at a first magnification and a second subaperture image generated at a second magnification that is less than the first magnification, and wherein a disparity map predicted from the first subaperture image is used as a reference disparity map to generate the predicted disparity error.

In an embodiment, the at least two subaperture images include a first subaperture image generated at a first magnification and a second subaperture image generated at a second magnification that is less than the first magnification, and wherein a disparity map predicted from the second subaperture image is used as a reference disparity map to generate the predicted disparity error.

A computer-implemented method is disclosed. The method involves storing data defining a model to predict disparity data from a multi-aperture image set that includes a first subaperture image and a second subaperture image, generating a first predicted disparity map from the first subaperture image using the model, generating a second predicted disparity map from the second subaperture image using the model, generating a disparity error from at least one of the first predicted disparity map and the second predicted disparity map, and training the model using the disparity error.

In an embodiment, the first and second subaperture images are captured using a two-dimensional microlens array, and wherein the method involves using a convolutional neural network (CNN) module that is configured to both compute disparity between the two subaperture images and predict disparity of at least one of the two subaperture images.

In an embodiment, the first and second subaperture images are formed by dissimilar focal lengths, which result in dissimilar magnification, and wherein the second subaperture image was captured at a lower magnification than the first subaperture image, and wherein the method involves using a predicted disparity error to train the model to predict disparity maps from subaperture images captured at the lower magnification.

In an embodiment, the first and second subaperture images are formed by dissimilar focal lengths, which result in dissimilar magnification, and wherein the second subaperture image was captured at a lower magnification than the first subaperture image, and wherein the method involves using the predicted disparity error to train the model to predict disparity maps from subaperture images captured at the higher magnification.

Another embodiment of a device is disclosed. The device includes a main lens, configured to receive an image from the field of view of the main lens, a multi-aperture optical component having optical elements of dissimilar focal lengths, optically coupled to the main lens and configured to create a multi-aperture image set that includes a plurality of subaperture images, wherein at least one point in the field of view is captured by at least two of the subaperture images and the at least two subaperture images are formed by optical elements having dissimilar focal lengths, an array of sensing elements, the array of sensing elements being optically coupled to the multi-aperture optical component and configured to generate signals that correspond to the at least two subaperture images, a ROIC communicatively coupled to the array of sensing elements and configured to receive the signals, which correspond to the at least two subaperture images, from the array of sensing elements, to convert the signals to digital data, and to output the digital data, and an image processing system, responsive to the digital data that is output from the ROIC, which is configured to generate disparity values that correspond to at least one point in common between the at least two subaperture images.

In an embodiment, the image processing system includes a convolutional neural network (CNN) module that is trained using a predicted disparity error that corresponds to an error between disparity maps generated from the at least two subaperture images.

In an embodiment, the at least two subaperture images include a first subaperture image generated at a first magnification and a second subaperture image generated at a second magnification that is less than the first magnification, and wherein a disparity map predicted from the first subaperture image is used as a reference disparity map to generate the predicted disparity error.

In an embodiment, the at least two subaperture images include a first subaperture image generated at a first magnification and a second subaperture image generated at a second magnification that is less than the first magnification, and wherein a disparity map predicted from the second subaperture image is used as a reference disparity map to generate the predicted disparity error.

In an embodiment, the image processing system includes a disparity-to-range module configured to generate an integrated range map from a high-resolution predicted disparity map predicted from the first subaperture image and from a low-resolution predicted disparity map predicted from the second subaperture image.

Another embodiment of a computer-implemented method is disclosed. The method involves storing data defining a model to predict disparity data from a multi-aperture image set that includes a first subaperture image and a second subaperture image, wherein the first and second subaperture images are formed by dissimilar focal lengths, which result in dissimilar magnification, generating a first predicted disparity map from the first subaperture image using the model, generating a second predicted disparity map from the second subaperture image using the model, generating a predicted disparity error that corresponds to a difference in predicted disparity between common points between the first predicted disparity map and the second predicted disparity map, and training the model using the predicted disparity error.

In an embodiment, the second subaperture image was captured at a lower magnification than the first subaperture image, and wherein the method involves using the predicted disparity error to train the model to predict disparity maps from subaperture images captured at the lower magnification.

In an embodiment, the second subaperture image was captured at a lower magnification than the first subaperture image, and wherein the method involves using the predicted disparity error to train the model to predict disparity maps from subaperture images captured at the higher magnification.

In an embodiment, the second subaperture image was captured at a lower magnification than the first subaperture image, and wherein the method involves using the first predicted disparity map as a reference to generate the predicted disparity error, and using the predicted disparity error to train the model to predict disparity maps from subaperture images captured at the lower magnification.

In an embodiment, the second subaperture image was captured at a lower magnification than the first subaperture image, and wherein the method involves using the second predicted disparity map as a reference to generate the predicted disparity error, and using the predicted disparity error to train the model to predict disparity maps from subaperture images captured at the higher magnification.

In an embodiment, the model is trained based on a cost function that enforces consistency between the first predicted disparity map and the second predicted disparity map.

In an embodiment, the cost function includes a disparity consistency component to enforce consistency between the predicted disparity values of the at least one subaperture image at one magnification and a second subaperture image at a second magnification.

In an embodiment, the first predicted disparity map and the second predicted disparity map are generated by a CNN module.

In an embodiment, predicted disparity values were computed by the CNN module for the first subaperture image formed by a first lens of a first and shorter focal length by training the CNN module using predicted disparity values of the second subaperture image formed by a second lens of a second and longer focal length, wherein the predicted disparity values resulting from the second subaperture image are used as a reference for the CNN module.

An embodiment of a method for operating an image processing system is disclosed. The method involves receiving a multi-aperture image set that includes a first subaperture image and a second subaperture image, wherein the first and second subaperture images were captured from a camera using dissimilar focal lengths, which result in dissimilar magnification, and wherein the second subaperture image was captured at a lower magnification than the first subaperture image, predicting a first disparity map from the first subaperture image using a neural network, predicting a second predicted disparity map from the second subaperture image using the neural network, generating a predicted disparity error that corresponds to a difference in predicted disparity between common points between the first predicted disparity map and the second predicted disparity map, and training the neural network using the predicted disparity error.

In an embodiment, the method involves using the predicted disparity error to train a portion of the neural network that predicts disparity maps from subaperture images captured at the lower magnification.

In an embodiment, the method involves using the predicted disparity error to train a portion of the neural network that predicts disparity maps from subaperture images captured at the higher magnification.

In an embodiment, the method involves using the first predicted disparity map as a reference to generate the predicted disparity error, and using the predicted disparity error to train a portion of the neural network that predicts disparity maps from subaperture images captured at the lower magnification.

In an embodiment, the method involves using the second predicted disparity map as a reference to generate the predicted disparity error, and using the predicted disparity error to train a portion of the neural network that predicts disparity maps from subaperture images captured at the higher magnification.

An embodiment of an image processing system is disclosed. The system includes at least one processor and memory configured to receive a multi-aperture image set that includes a first subaperture image and a second subaperture image, wherein the first and second subaperture images were captured from a camera using dissimilar focal lengths, which result in dissimilar magnification, and wherein the second subaperture image was captured at a lower magnification than the first subaperture image, predict a first disparity map from the first subaperture image using a neural network, predict a second predicted disparity map from the second subaperture image using the neural network, generate a predicted disparity error that corresponds to a difference in predicted disparity between common points between the first predicted disparity map and the second predicted disparity map, and train the neural network using the predicted disparity error.

In an embodiment, the predicted disparity error is used to train a portion of the neural network that predicts disparity maps from subaperture images captured at the lower magnification.

In an embodiment, the predicted disparity error is used to train a portion of the neural network that predicts disparity maps from subaperture images captured at the higher magnification.

In an embodiment, the first predicted disparity map is used as a reference to generate the predicted disparity error, and the predicted disparity error is used to train a portion of the neural network that predicts disparity maps from subaperture images captured at the lower magnification.

In an embodiment, wherein the second predicted disparity map is used as a reference to generate the predicted disparity error, and the predicted disparity error is used to train a portion of the neural network that predicts disparity maps from subaperture images captured at the higher magnification.

Other aspects in accordance with the invention will become apparent from the following detailed description, taken in conjunction with the accompanying drawings, illustrated by way of example of the principles of the invention.

DETAILED DESCRIPTION OF EMBODIMENTS OF THE INVENTION

What is desired is a device, an network architecture, and/or techniques that address limitations of conventional image and video based ranging techniques, thereby significantly increasing the quality and quantity of range and depth results, whereby a deep learning neural network based system for depth estimation incorporates prediction of depth throughout the entire field of view of the lens, where also multi-aperture data is available in the near field of input images, and where training a neural network (e.g., a CNN) is not fully dependent on training data originating from a different system.

An embodiment of a device is disclosed. The device includes a main lens configured to receive a main image of a field of view of the main lens, a multi-aperture optical component optically coupled to the main lens and configured to create a plurality of subaperture images incorporating parallax based on the main image, a photodetector array comprising a plurality of photodetectors, the photodetector array being optically coupled to the multi-aperture optical component and configured to generate output signals from the photodetectors based on the array of subaperture images, a read-out integrated circuit (ROIC) communicatively coupled to the photodetector array and configured to receive the signals from the photodetector array, convert signals to digital signals and to output digital data, a computational processor, and computational photogrammetry and CNN ranging software to produce image reconstruction, image manipulation and range and depth data from the subaperture images.

According to one aspect, the present invention provides a computer-implemented method comprising storing data defining a statistical model to predict depth data throughout the field of view of each subaperture image collectively comprising a multi-aperture image frame; and training the model on at least one input set of subaperture images, by: predicting, for at least one subaperture image in the set, corresponding disparity values throughout the field of view, computing disparity from at least two subaperture images in the set in the region where the fields of view overlap between the at least two subaperture images, and updating the model based on a cost function of the predicted disparity and computed disparity that enforces consistency between the predicted and computed disparity values for each subaperture image in the multi-aperture set.

Training the model may comprise computing projected disparity values for at least one subaperture image based on the corresponding disparity values for at least two subaperture images of the training image. For example, the disparity values may be computed for a region of one subaperture image by analyzing the subaperture image and another subaperture image where fields of view overlap and parallax exists between the two subaperture images.

Training the model may further comprise computing, for at least two input subaperture images, by: predicting, for a first subaperture image, corresponding disparity values that enable reconstruction of the first subaperture image when applied to a second subaperture image; and updating the model based on a cost function that enforces consistency between the predicted disparity values for each subaperture image in the set of multi-aperture images.

A reconstruction module of the model may reconstruct a first subaperture image in the subaperture image set by applying the corresponding predicted and computed disparity values to shift sampled image pixels of a second subaperture image in the subaperture image set. The cost function may further include a reconstructed appearance matching component to minimize an image reconstruction error between the reconstructed image and the corresponding input image. Sampling may comprise bilinear interpolation.

The cost function may further include a smoothness component to encourage local smoothness in the corresponding predicted disparity values. The cost function may implement a weighted sum of the disparity consistency component, the smoothness component, and the reconstructed appearance matching component.

The statistical model may comprise a convolutional neural network, CNN, including a structured arrangement of processing nodes, each processing node having at least one parameter value. The convolutional neural network may be trained by back-propagating components of the cost function.

Training the model may further comprise up-sampling and up-convolving the input subaperture image data at a plurality of spatial resolutions and predicting corresponding disparity values at each spatial resolution, wherein the model is updated based on a cost function that enforces consistency between the predicted disparity values at each spatial resolution for each subaperture image in the multi-aperture frame. The cost function may comprise a weighted enforcement of consistency between the predicted disparity values depending on the spatial resolution.

The subaperture images of training images may be captured at the same time by a camera with a main lens and a multi-aperture optical component of known focal lengths and with a focal plane array of known dimensions and geometry. The resulting subaperture training images may be rectified into a common perspective in preparation for disparity analysis. The digital subaperture and multi-aperture images may be annotated with metadata defining attributes of the camera that captured the input image.

According to yet another aspect, a depth image may be generated from an input subaperture image or reconstructed 2D image by: generating a predicted disparity map from the input subaperture image or reconstructed image using a disparity prediction module of the trained model; and calculating corresponding estimated depth data from the predicted disparity map. The subaperture image data may be captured by a camera and the computational photogrammetry module may be configured to reconstructed 2D images of higher resolution than the subaperture images that contributed.

Advantageously, the present invention provides a fully convolutional model that fully utilizes the available parallax data intrinsic to a multi-aperture camera and is trained to synthesize depth data throughout the entire field of view. The convolutional model learns to predict the pixel level correspondence between pairs of rectified subaperture images that are generated with optics of known focal lengths and a focal plane array of known geometry.

Additionally, embodiments provide: a network architecture that performs self-supervised multi-aperture depth estimation with a novel training loss that incorporates a plurality of subaperture-image disparities consistency constraint; an evaluation of several different training losses and image formation models highlighting the effectiveness of the described approach; and a model that generalizes to other different datasets.

According to another aspect, the present invention provides an self-supervised deep neural network for monocular depth estimation using a monocular multi-aperture camera, where there is only a single multi-aperture image input to the network, where the multi-aperture image is comprised of at least two subaperture images, and where no assumptions about the scene geometry or types of objects present are made. Instead of using aligned ground truth depth data, which may not be available in particular implementation contexts or may be costly to obtain, the present invention exploits the ease with which the intrinsic multi-aperture data can also form the basis of ground truth data for at least some points within a region of overlap between at least two subaperture images. According to yet another aspect, the learning module implements a loss function that enforces consistency between the predicted depth maps from each subaperture view during training, leading to improved predictions. The resulting output depth data is superior to semi-supervised and fully-supervised baselines, despite the omission of full field-of-view ground truth depth information in the training stage. Furthermore, the trained model can generalize to datasets not seen during training and still produce viable depth maps.

In an embodiment of the device, the multi-aperture optical component is comprised of a plurality of microlenses.

In an embodiment of the device, the multi-aperture optical component is comprised of a plurality of microprisms.

In an embodiment of the device, multi-view stereo can replace the multi-aperture optical component for generation of training data.

In an embodiment, a ranging system includes the device and a processor configured to generate data to reconstitute at least one of a two-dimensional and three-dimensional image based on an input of at least two subaperture image data received from the ROIC.

According to another aspect, the depth information generated includes at least one of absolute depth data and relative depth data measured from at least one of the subaperture images and between objects within the subaperture image.

According to another aspect, the at least one of 2D output image and range image includes at least one of absolute temperature and relative temperature data.

A ranging multi-aperture camera that captures four dimensional (4D) light-fields and uses CNN inference, that leverages both physics-based computations and pure inference to extract three-dimensional (3D) range information, can be valuable to markets such as, for example, the autonomous vehicle and robotic mobility markets. Such a "Multi-Aperture Monocular Ranging" camera can be made by transforming a conventional two-dimensional camera through the addition of a multi-aperture optical element, such as a microlens or microprism array, and combining the camera with ranging CNN software that fully exploits and expands the intrinsic physics-based multi-aperture ranging capability. Whereas multi-aperture ranging is highly effective, it is only available where object features are perceived in two or more subaperture images' fields of view, thereby generally restricting ranging data to the center regions of a subaperture image where overlap with another occurs.

New techniques, such as CNN based monocular ranging, suffer no such field of view limitations and agreeably predict disparity data, which in turn can be converted to range data, throughout the entire field of view of the input image. However, a limitation of all current monocular ranging art is that its CNN is trained on image content that, while similar to what will be encountered during inference, is generally only an approximate representation of data that is anticipated to be encountered, and even in the most favorable examples reported depth and range are ultimately just predictions.

The techniques described herein artfully blend the techniques of multi-aperture ranging and CNN monocular ranging to overcome the shortcomings of each approach. The present disclosure describes a means to compute depth and range data throughout the entire field of view of a camera such as a monocular camera, thereby improving on multi-aperture ranging techniques. The present disclosure also describes a means of operating a monocular CNN inference that incorporates parallax data for a portion of the scene for which range will be predicted, improving the accuracy of such range data by considering the optical disparity perceived between at least two subaperture images. The subaperture images being a known, fixed distance apart provides a baseline reference which can be used as a ground truth for self-supervised training of the overlap regions, improving the inference for both the overlap and non-overlap regions of the scene. Therefore, the multi-aperture monocular ranging technique described herein is not subject to range data error and uncertainty that inevitably results from CNN training data that does not perfectly match the camera's present world view. Likewise, the techniques described herein are not subject to the field of view limitations of all systems relying on parallax data to derive range data.

Furthermore, a multi-aperture monocular ranging camera as described herein can adaptively and digitally focus to where objects of interest are hiding behind obscurants using the multi-aperture camera's unique digital focus capability. For example, vehicles up ahead that are partially or wholly obscured by environmental conditions may still be reliably perceived because the camera described herein focuses on the vehicles of interest and not on the obscurants masking them. Therefore, a multi-aperture monocular ranging camera that includes multi-aperture optics and a ranging CNN can be an essential component of an "always on" Simultaneous Location and Mapping (SLAM) system to enable true autonomous vehicles in all weather conditions.

Referring to FIG. 1, a simplified schematic illustration of an exemplary multi-aperture camera 200 is depicted. This example of a multi-aperture camera is a plenoptic camera of a type often referred to as a plenoptic 2.0 camera. In this illustration, the plenoptic camera 200 is focused on an external object 202.

The external object 202 within the camera's 200 field of view 205 at least one of radiates or reflects energy that is focused by the main (or collecting) lens 204 to an inverted intermediate focal plane 206. The multi-aperture optical component 208, in this example a two dimensional microlens array, is placed between the intermediate focal plane 206 and a detector array 210 at an image plane. The multi-aperture optical component 208 (e.g., a microlens array) is comprised of a plurality of optical elements 214, in this example microlenses commonly referred to as lenslets, and may be arranged in a geometric pattern such as rectilinear or hexagonal. The detector array 210 is comprised of a plurality of sensor elements 212 such as photo sensitive photodetectors and is electrically connected to a ROIC 213. In exemplary plenoptic 2.0 camera 200, the multi-aperture optical component 208 is focused on both the intermediate focal plane 206 behind it and the sensor elements 212 (e.g., photodetectors) ahead of it. In this configuration, the Plenoptic camera 200 forms a multi-aperture image set on the detector array 210 that is the aggregate result of the subaperture images that correspond to each optical element 214 (e.g., microlens). FIG. 1 shows a multi-aperture image 230 that includes four subaperture images 240-243 as would be formed by four corresponding optical elements 214 (e.g., lenslets) of the multi-aperture optical component 208 (e.g., microlens array).

The multi-aperture camera 200 captures information (or data) about the light field emanating from an object of interest in the camera's field of view 205. Such imaging data includes information about the intensity of the light emanating from the object of interest and also information about the direction that the light rays are traveling in space. Through computational imaging techniques (or computational photography or computational photogrammetry), which may be implemented on a separate processor, the imaging data can be processed to reconstruct a single 2D image from the plurality of subaperture images 240-243, typically of much higher resolution than that of the contributing subaperture images. Because the position of each optical element 214 (e.g., microlens or lenslet) is known relative to the sensor elements 212 (e.g., photodetectors) of the detector array 210, the angle of incident energy from each optical element 214 (e.g., microlens) is also known. Accordingly, range and depth information can be determined from the perceived parallax between any two photodetectors 212 viewing the same area of the object 202 through at least two different optical elements 214 (e.g., microlenses).

Computational photogrammetry can also provide a variety of images that a conventional camera is not capable of providing. For example, in addition to being able to generate 3D image information of an object of interest, such a camera 200 is also capable of changing focal planes and perspective views on an image captured in a single shutter action (or shutter actuation period) of the camera.

Figure 2:
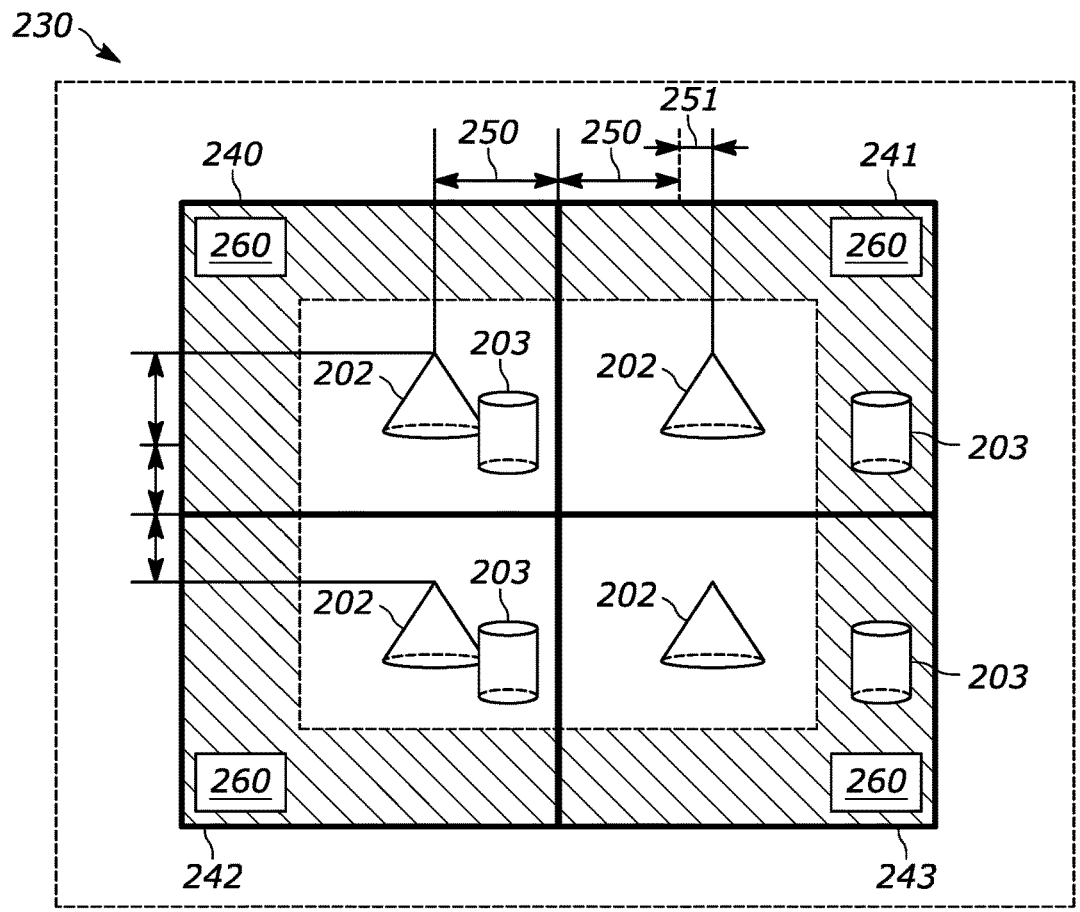
FIG. 2 depicts a simplified schematic illustration of an example of a multi-aperture image, wherein an object in the near field is shifted out of overlapping field of view region and therefore is not suitable for physics-based ranging.

Referring to FIG. 2, an exemplary multi-aperture image set 230 illustrates two objects at different ranges. The objects are only visible in a subregion of each subaperture field of view that overlaps with at least one other subaperture image, and therefore a region of each subaperture image 260 is not available to contribute to optics-based ranging computations. An object 202 (e.g., a cone) is positioned in the far field and an object 203 (e.g., a cylinder) in the near field. Therefore, when viewed from two perspectives as realized by two horizontally adjacent subaperture images 240 and 241, a parallax shift is observed along a horizontal epipolar line 250, whereas a point on the cone object 202 has shifted an amount 251 between the two subaperture images where the object 202 is still imaged in both subaperture images. Another object 203 placed closer to the camera 200 will shift more and it is shown the nearfield object 203 is not visible in the right subaperture image 241 and therefore physics-based range information is not available for this object 203 within these two subaperture images 240 and 241.

Figure 3:
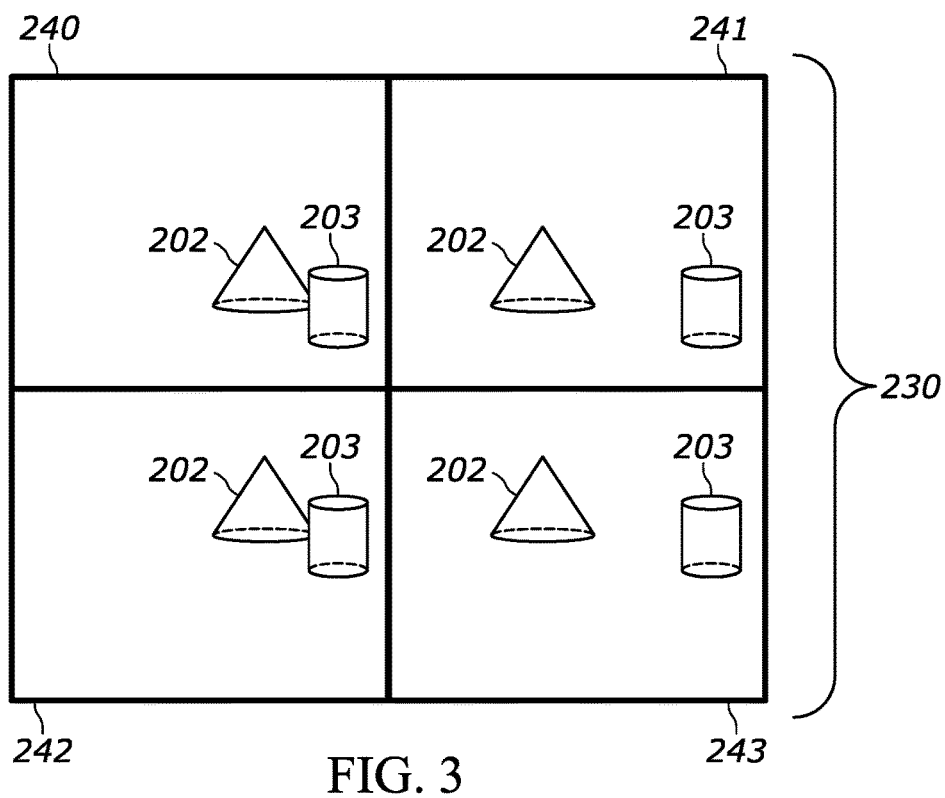
FIG. 3 depicts a simplified schematic illustration of an example of a multi-aperture image, wherein objects in the near field and far field are viewable in each subaperture image and therefore candidates for CNN single-image ranging throughout each subaperture image.

Referring to FIG. 3, an exemplary multi-aperture image set 230 once again illustrates two objects at different ranges. The objects are both in at least one subaperture image, and therefore CNN range techniques may apply to both objects and indeed to all content throughout each subaperture image.

Figure 4:
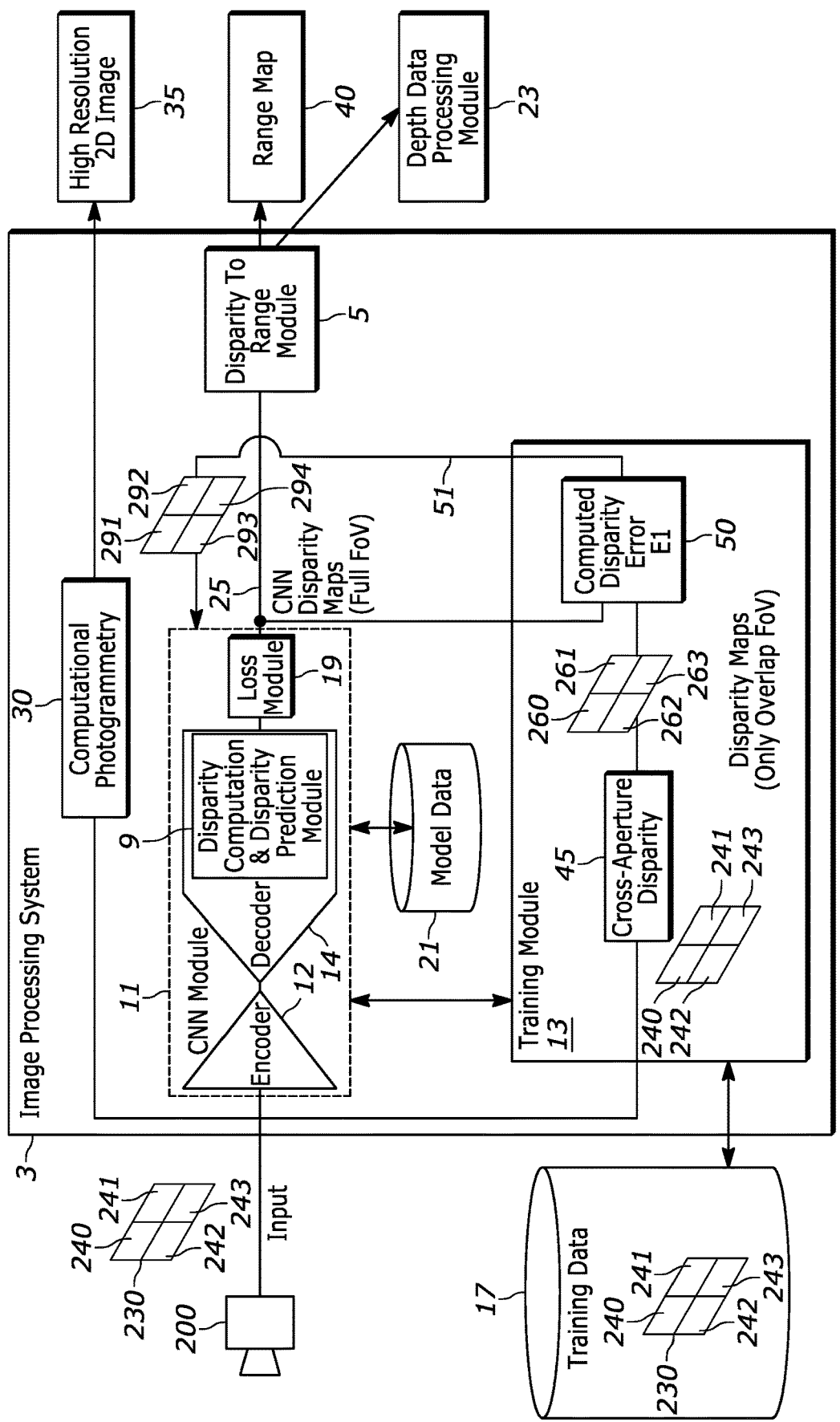
FIG. 4 is a block diagram showing the main components of an image processing system according to an embodiment of the invention including the inference network, computational photogrammetry module and the main processing steps performed by the training module to train a set of subaperture images for CNN depth prediction based on computed disparity data.

FIG. 4 is a block diagram of an example system for calculating, predicting, and processing depth and range data from multi-aperture image data that is generated from a camera such as the camera described above. As illustrated, the system includes an image processing system 3 having a convolutional neural network (CNN) module 11 that may receive multi-aperture image set 230 captured from the multi-aperture camera 200, such as comprising two or more subaperture images containing parallax between common object points in the captured view. The multi-aperture image set 230 and elemental subaperture images 240-243 may be annotated with metadata defining the respective images and the camera system 200 that captured the image. A depth data from disparity data generator module 5 (identified as disparity to range module in FIG. 4) uses at least one of a disparity predictor and a disparity computation from disparity computation and disparity prediction module 9 of the trained CNN module 11 to generate a subaperture range and depth map 40 directly from the received subaperture image data of the multi-aperture image set 230. The generated multi-aperture disparity values of a multi-aperture disparity map 25 that is output from the CNN module 11 are representative of the difference in image location of a detected object or feature in the input subaperture images 240-243 and a predicted image location of the object or feature in a corresponding notional multi-aperture view, if the source image was one of a subaperture image captured by a calibrated multi-aperture camera. The disparity data generator module 5 computes depth and range information from the multi-aperture disparity map 25 that is output by the disparity computation and disparity prediction module 9 (e.g., disparity predictor) of the CNN module 11.

In an embodiment, the CNN module 11 includes a dynamic structured arrangement of processing nodes, each node having a corresponding weight parameter. The structure and weights defining the CNN module 11 are updated by a training module 13 during a training stage. In this embodiment, the processing nodes of the CNN module 11 are arranged into three main components: an encoder 12 that includes nodes and layers to: process input subaperture image data and output encoded data indicative of objects or features in the input images; a decoder 14 that includes nodes and layers to: process the encoded data from the encoder 12, perform up-convolution and up-sampling to output scaled data at an increased spatial resolution, output multi-aperture disparity maps 25, including predicted disparity data and computed disparity data (where object features exists in two or more subaperture images) from input encoded data output by the disparity computation and disparity prediction module 9 (e.g., disparity predictor), and output projected views by applying the disparity maps to input subaperture image data.

As will be described in greater detail below, in an embodiment, the training module 13 trains the CNN module 11 based on multi-aperture image set 230, retrieved for example from a database 17 of training data of multi-aperture image sets 230. The multi-aperture image sets 230 include, by way of example, a multi-aperture view composed of four subaperture images as would result from a four lenslet microlens array (or a multi-view stereo system), top left view 240, top right view 241, bottom left view 242, and bottom right view 243 that are captured at the same time by the multi-aperture camera 200 with a known camera focal length and with a focal plane of known dimensions and geometry, whereby depth data may be computed from the predicted cross-aperture disparity values output by the disparity computation and disparity prediction module 9 (e.g., disparity predictor). In an embodiment, the training module 13 optimizes a loss function implemented by a loss module 19 of the CNN module 11 and as a result, trains the disparity computation and disparity prediction module 9 (e.g., disparity predictor) to accurately and efficiently generate the predicted and computed multi-aperture disparity map 25 directly from each subaperture image.

It should be appreciated that the CNN module 11, the training module 13, and the disparity to range module 5 (e.g., depth data generator module) may be combined into a single module or divided into additional modules, and the image processing system 3 may include additional components, such as a memory 21 to store model data of the trained CNN module 11. The system may also include other components, sub-components, modules, and devices commonly found in a computing system/device, which are not illustrated in FIG. 4 for clarity of the description.

The depth information output by the image processing system 3 may be provided to one or more depth data processing module 23 for further data processing. The depth data processing module 23 may be configured to output data and/or control signals to an output device (not shown) based on the processed depth data. The nature and arrangement of the depth data processing module will be specific to the implementation context of the system. Purely by way of exemplary concrete implementations: the range/depth maps 40 may be predicted from captured image data relating to synthetic object insertion in computer graphics; determining synthetic depth of field in computational photography; generating control instructions for robotic grasping; outputting depth as a cue in human body pose estimation; determining strong cues for hand pose estimation in human computer interaction; automatic 2D to 3D conversion for film video data; low cost obstacle avoidance sensors for autonomous cars; small form factor, single camera, depth sensing, endoscopes for surgery, single camera 3D reconstruction; improved pose estimation for VR headsets; obstacle avoidance and path mapping for the blind; size and volume estimation for object metrology. It should be appreciated that the database 17 of training data may include multi-aperture image sets 230 of views specific to the particular implementation context. Multi-aperture image sets 230 of the training data may be generated using, for example, a multi-lens array (e.g., multi-aperture optical component 208) or a multi-view stereo image capture system having at least two independent cameras to capture multi-aperture images. An advantage of the techniques described herein is that the trained system produces superior depth maps by predicting the full field-of-view disparity from all available subaperture images and enforcing them to be consistent with each other. Generating a top right view 241 with pixels from the top left view 240 leads to a disparity map aligned with the top right view (and vice versa). This predicted disparity map may be combined with physics-based computed disparity between the top right 241 and top left 240 views for objects and features that appear in each subaperture image. In this way the system seamlessly produces optimal range and depth data that incorporates both computed disparity for the overlapping subset of the field of view and predicted disparity throughout the entire field of view. This process can be repeated with views from the top right 241 and bottom right 243, and indeed between any two or more subaperture images featuring a common object point, to further add confidence to the predicted and computed disparities.

In an embodiment, the training module 13 aims to optimize the alignment of each predicted disparity error map 291-294 to its corresponding source input subaperture image 240-243. During training, for the example currently used, a Cross-Aperture Disparity Module 45 within the training module 13 has access to the top left 240, top right 241, bottom left 242, and bottom right 243 subaperture images and the training module 13 trains the CNN module 11 to estimate both left-to-right, right-to-left, top-to-bottom, and bottom-to-top disparity maps, as well as to determine corresponding projected right-to-left, left-to-right, top-to-bottom and bottom-to-top disparity maps from the respective estimated disparity maps, and to enforce consistency therebetween. Where features exist in two or more subaperture images 240-243, disparity images 260-263 can be not only predicted, but computed, by the Cross-Aperture Disparity Module 45, thereby serving as a source of ground truth for training and inference modes.

In an embodiment, an additional optimization goal of the training module 13 is to train the CNN module 11 to reconstruct the corresponding left, right, top, and bottom views by learning the disparity maps that can shift the pixels to minimize an image reconstruction error. In this way, given training images from a multi-aperture camera 200, the image processing system 3 learns a function that is able to reconstruct an image given the other view, and in so doing, generates a trained model (i.e., the CNN module 11) that enables prediction or estimation of the shape of the scene that is being imaged. Given a single training image, for example, the top left view 240 of a multi-aperture image set 230 that includes four subaperture images, the image processing system 3 also learns a function that can predict the per-pixel depth, thereby treating depth estimation as an image reconstruction problem during training. The areas of physics-based computed disparity in images 260-263, are compared to the same areas within predicted disparity images 25 by the Computed Disparity Error Module 50 to produce a computed disparity error function 51 corresponding to predicted error disparity maps 291-294.

Figure 5:
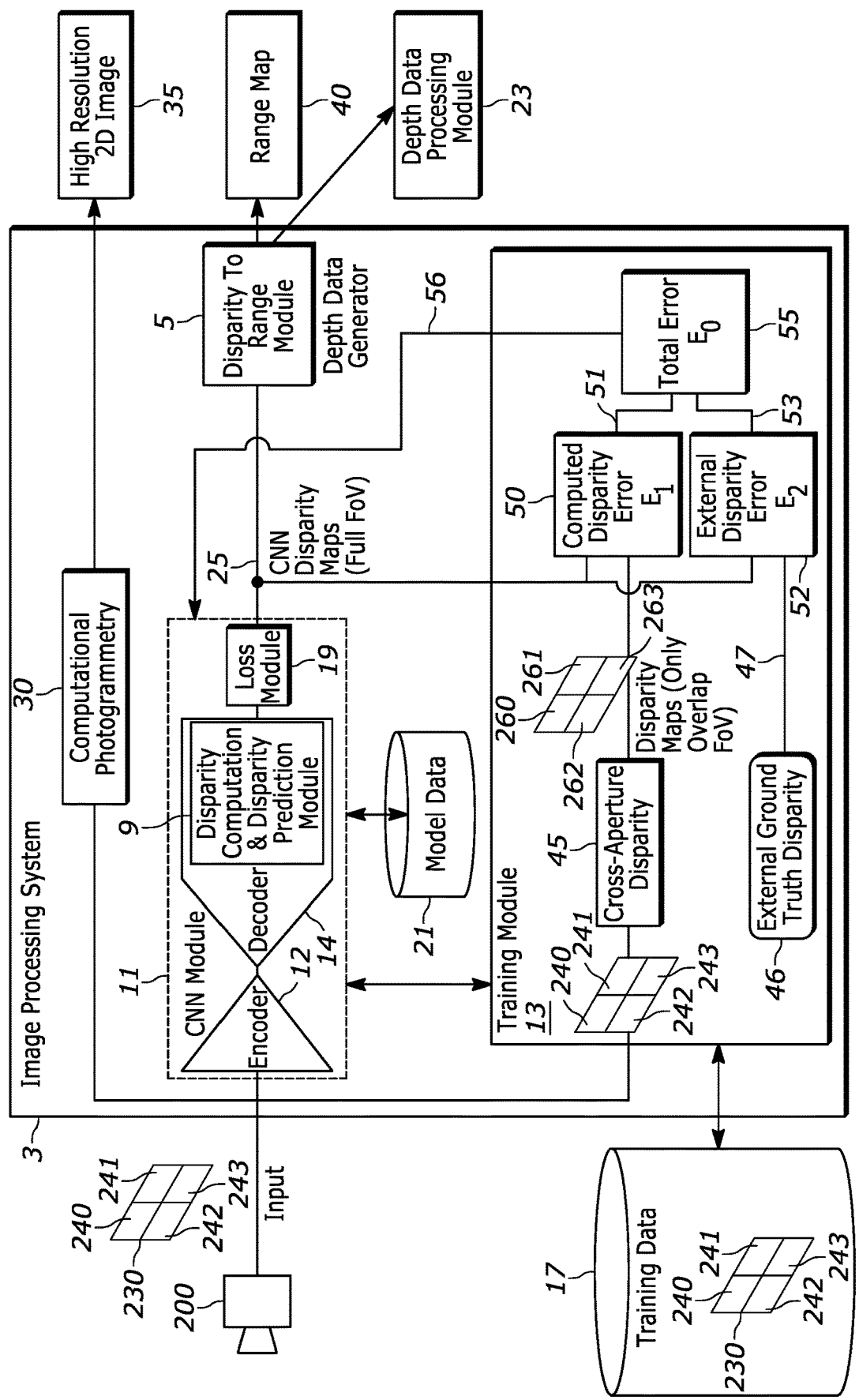
FIG. 5 is a block diagram illustrating the main processing steps performed by the training module to train a set of subaperture images for depth prediction CNN based on computed disparity data and external ground truth data, according to an embodiment.

FIG. 5 is a block diagram illustrating that the training module 13 may also include disparity error data from external sources (e.g., external ground truth disparity 46). The source of external disparity range and depth data 47 may include by way of example and not limitation: LiDAR, Radar, Stereoscopic, Topographical, and hand measured data. In an embodiment, the disparity data 25 predicted by the CNN module 11 is compared to the external ground truth disparity data 47 by an external disparity error module 52 to produce external disparity error data 53. The external disparity error data 53 is combined with computed disparity error function 51 in a total error module 55 to produce an aggregate error 56 the is provided to the CNN module 11 for training.

Figure 6:
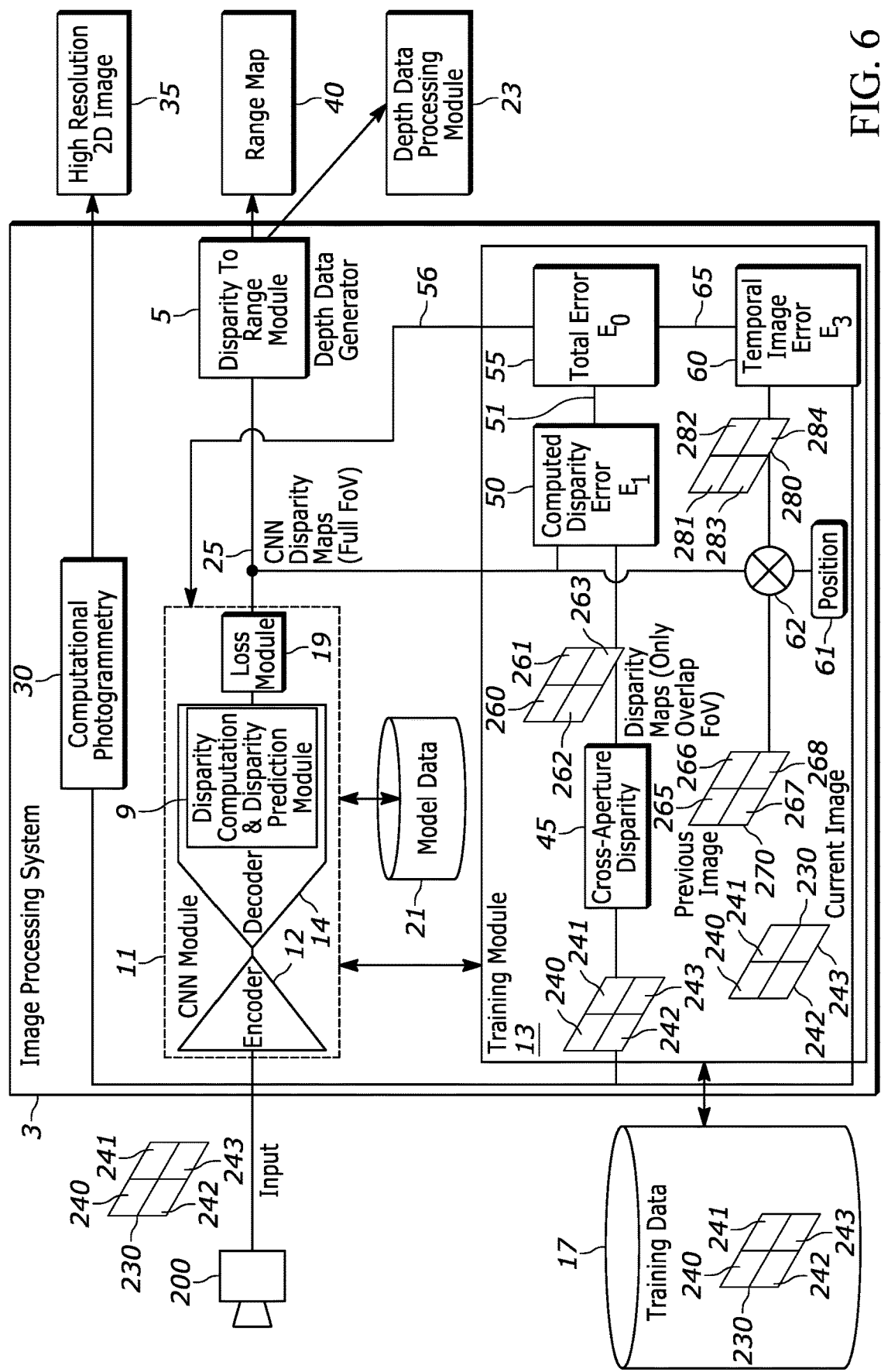
FIG. 6 is a block diagram illustrating the main processing steps performed by the training module to train a set of subaperture images for depth prediction CNN based on computed disparity data and temporal image data, according to an embodiment.

FIG. 6 is a block diagram illustrating that the training model 13 may also include image loss data 65 computed by a Temporal Image Error module 60. A new multi-aperture image set 280, which includes subaperture images 281-284, may be synthesized by combining the current disparity image 25, a previous multi-aperture image set 270 and position data 62 from a position module 61 that reflects displacement and perspective difference between the current multi-aperture image set 230 and a previous multi-aperture image set 270. The synthesized multi-aperture image set 280 may then be compared with the current multi-aperture image set 230 by the Temporal Image Error Module 60 to produce the image loss data 65 to be ingested by the Total Error Module 55 to produce aggregate error 56.

The multi-aperture optical component 208 may be any optical component that includes optical elements that produce a multi-aperture image and may include any number of elements arranged in any manner. For example, the multi-aperture optical component may be Rectilinear, hexagonal, or other packing and may include any number of elements from a few as two to an unbounded maximum.

The present invention applies to cameras of all wavebands including visible, near infrared, shortwave infrared (SWIR), midwave infrared, and longwave infrared.

In an embodiment, sensing elements may include photodetectors, colloidal quantum dot (CQD) sensor elements, microbolometer sensor elements, photoconductive sensor elements, and/or photovoltaic sensor elements.

Systems and methods are described for predicting and computing depth from a multi-aperture image set, which includes a plurality of subaperture images, using a statistical model such as a CNN. The model is trained on subaperture images, enabling depth data to be predicted and computed from a single multi-aperture image set that is obtained from a camera such as a monocular camera. In an embodiment, the model is trained to predict, for each subaperture image of a multi-aperture image set, corresponding disparity values that enable reconstruction of another image when applied, to the image. The model is updated based on a cost function that enforces consistency between the predicted disparity values for each subaperture image in the multi-aperture image set.

Referring to FIG. 3, an exemplary multi-aperture image set 230 formed by microlenses having the same focal length illustrates two objects at different ranges. The objects are both in at least one subaperture image, and therefore CNN-based ranging techniques may apply to both objects and indeed to all content throughout each subaperture image.

In accordance with another embodiment of the invention, a CNN module predicts disparity maps from subaperture images that are captured at different magnifications and an error between the predicted disparity maps in overlapping regions of the maps is used to train the CNN module. In one example implementation, disparity maps are predicted from subaperture images that are captured at different magnifications (e.g., one subaperture image captured at 1× magnification and another subaperture image captured at 2× magnification) and the disparity map that is predicted from the higher magnified subaperture image is used as a reference disparity map to train a CNN module that makes disparity map predictions. It has been realized that the disparity map that is predicted from the higher magnified subaperture image (and thus higher resolution subaperture image) can be relied on to produce more accurate range information for objects in the corresponding subaperture image than a disparity map predicted from the lower magnified subaperture image and thus can be used as a reference to train the CNN module to make more accurate predictions of disparity maps corresponding to the subaperture images that are captured at the lower magnification (and thus lower resolution subaperture images). The subaperture images captured at the lower magnification will typically have a wider field of view and lower resolution, but by enforcing consistency with a reference disparity map (e.g., the disparity map predicted from the higher magnified/higher resolution subaperture image), accurate and reliable disparity maps and corresponding range maps can be generated over the full field of view of the camera system. In another example implementation, because the subaperture images captured at lower magnification typically have a wider field of view, the corresponding predicted disparity map can be used as a reference to train the CNN module that generates a disparity map using the higher magnified image when an object fills the view.

Figure 7:
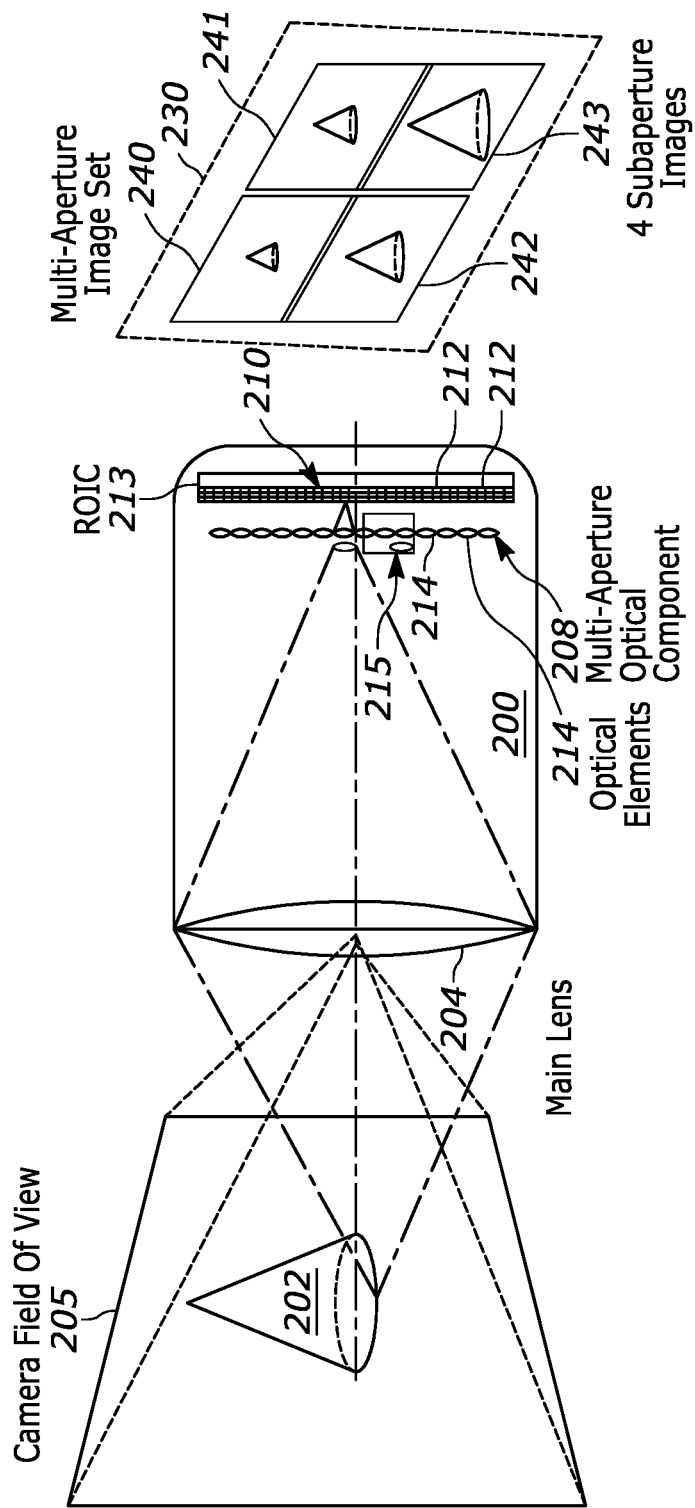
FIG. 7 depicts a camera system, an object in a camera field of view, and a multi-aperture image set that is generated by sensing elements of the detector array that are electrically connected to the ROIC.

FIG. 7 depicts a camera system 200, an object 202 in a camera field of view 205, and a multi-aperture image set 230 that is generated by sensing elements 212 of the detector array 210 that are electrically connected to the ROIC 213. In an embodiment, the ROIC is integrated into the camera system that is implemented as a monocular camera in that the camera system has a main lens 204 through which all of the sensed electromagnetic energy passes. As illustrated in FIG. 7, a multi-aperture image set 230 includes multiple subaperture images 240, 241, 242, and 243 and may be formed in part by a multi-aperture optical component 208 that includes optical elements 214 (e.g., also referred to as multi-aperture optical elements, lenses, and/or microlenses) of dissimilar focal lengths, or a combination of optical elements that result in dissimilar focal lengths, which produce corresponding dissimilar magnifications of the object 202 between subaperture images formed by the dissimilar focal lengths. By means of illustration and not limitation, the top left subaperture image 240 of the multi-aperture image set 230 is formed with an optical element 214 that has a focal length. The top right subaperture image 241 is formed by a combination of optical elements 214 and 215 that together form a focal length that is longer than the focal length of optical element 214. The subaperture image 241 in FIG. 7 shows the object 202 at a higher magnification than shown in subaperture image 240. In particular, the size of the object 202 is larger in subaperture image 241 than in subaperture image 240. Note that the magnification difference corresponding to the net focal length difference can be applied to any of the subaperture images through any net focal length. In the example of FIG. 7, the object 202 appears larger in subaperture images 242 and 243 than in subaperture images 240 and 241 due to progressively increasing magnification resulting from progressively longer focal lengths of corresponding optical elements.

Figure 8:
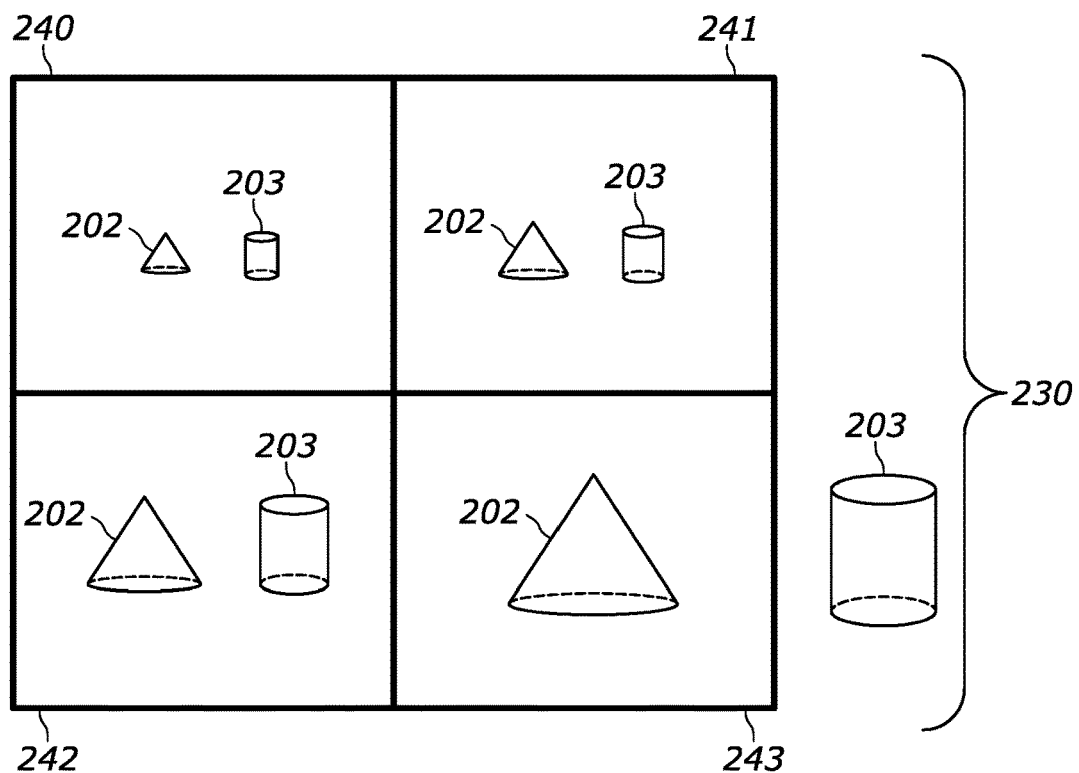
FIG. 8 depicts subaperture images of the multi-aperture image set, which result from optical elements with progressively longer focal lengths.

Referring to FIG. 8, subaperture images 240-243 of the multi-aperture image set 230 are shown, which result from optical elements with progressively longer focal lengths, where the net focal length of optical elements corresponding to subaperture image 243 is longer than the net focal length of optical elements corresponding to subaperture image 242, where the net focal length of optical elements corresponding to subaperture image 242 is longer than the net focal length of optical elements corresponding to subaperture image 241, where the net focal length of optical elements corresponding to subaperture image 241 is longer than the net focal length of optical elements corresponding to subaperture image 240. In an embodiment, there is very little to no disparity, or light path angular difference, present between subaperture images 240-243 in the multi-aperture image set 230 such that the relative position of the two objects 202 and 203 in the subaperture images 240-243 does not change despite the fact the objects 202 and 203 are at different ranges. This is in contrast to the case described with reference to FIGS. 2 and 3 in which the position of the objects 202 and 203 in the subaperture images 240-243 changes between subaperture images due to the angular differences in the light paths that result from differences in range of the objects, where the range of an object is the distance between the camera and the object.

Figure 9:
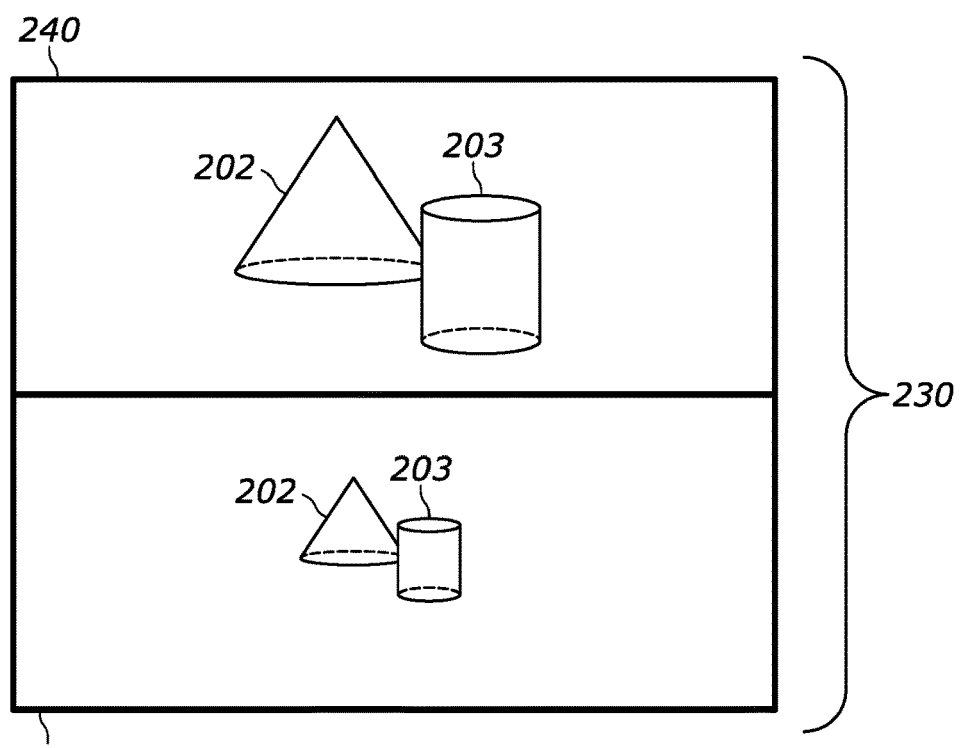
FIG. 9 depicts subaperture images of a multi-aperture image set in which a top subaperture image is formed by optical elements of focal lengths that are longer than a bottom subaperture image.

In an embodiment, there may be only two subaperture images that are captured by the sensing elements 212 and the ROIC 213 and the two subaperture images may be in two rectangles stacked on top of each other. Referring to FIG. 9, a top subaperture image 240 of the multi-aperture image set 230 is formed by optical elements of focal lengths that produce an image showing objects 202 and 203, where object 203 is relatively closer to the camera than object 202. Subaperture image 242 of the multi-aperture image set 203 is formed simultaneously with subaperture image 240 by optical elements of focal lengths that are shorter than that used to form subaperture image 240. For example, the subaperture image 240 is magnified relative to the subaperture image 242 because the optical elements used to form the subaperture image 240 have a higher magnification (e.g., longer focal length) than the optical elements used to form the subaperture image 242 (e.g., a shorter focal length). Therefore, the objects 202 and 203 appear smaller, or further away, in subaperture image 242 than in subaperture image 240. In an embodiment, the subaperture image 242 is captured with optical elements that have a first magnification, referred to as "1×" magnification, and the subaperture image 240 is captured with optical elements that have a second magnification, "2×," which is twice the magnification of the 1× magnification.

In the example of FIG. 9, CNN-based ranging techniques may be applied to both the top and bottom subaperture images 240 and 242, whereas the performance of the CNN-based ranging may be higher (e.g., improved maximum range and improved range accuracy) in the subaperture image 240 formed by an optical element (or optical elements) with a longer focal length and hence higher magnification relative to the subaperture image 242. Conversely, CNN-based ranging may be applied to a larger or wider field of view in the subaperture image 242 formed by an optical element (or elements) with a shorter focal length and hence lower magnification relative to the subaperture image 240.

Figure 10:
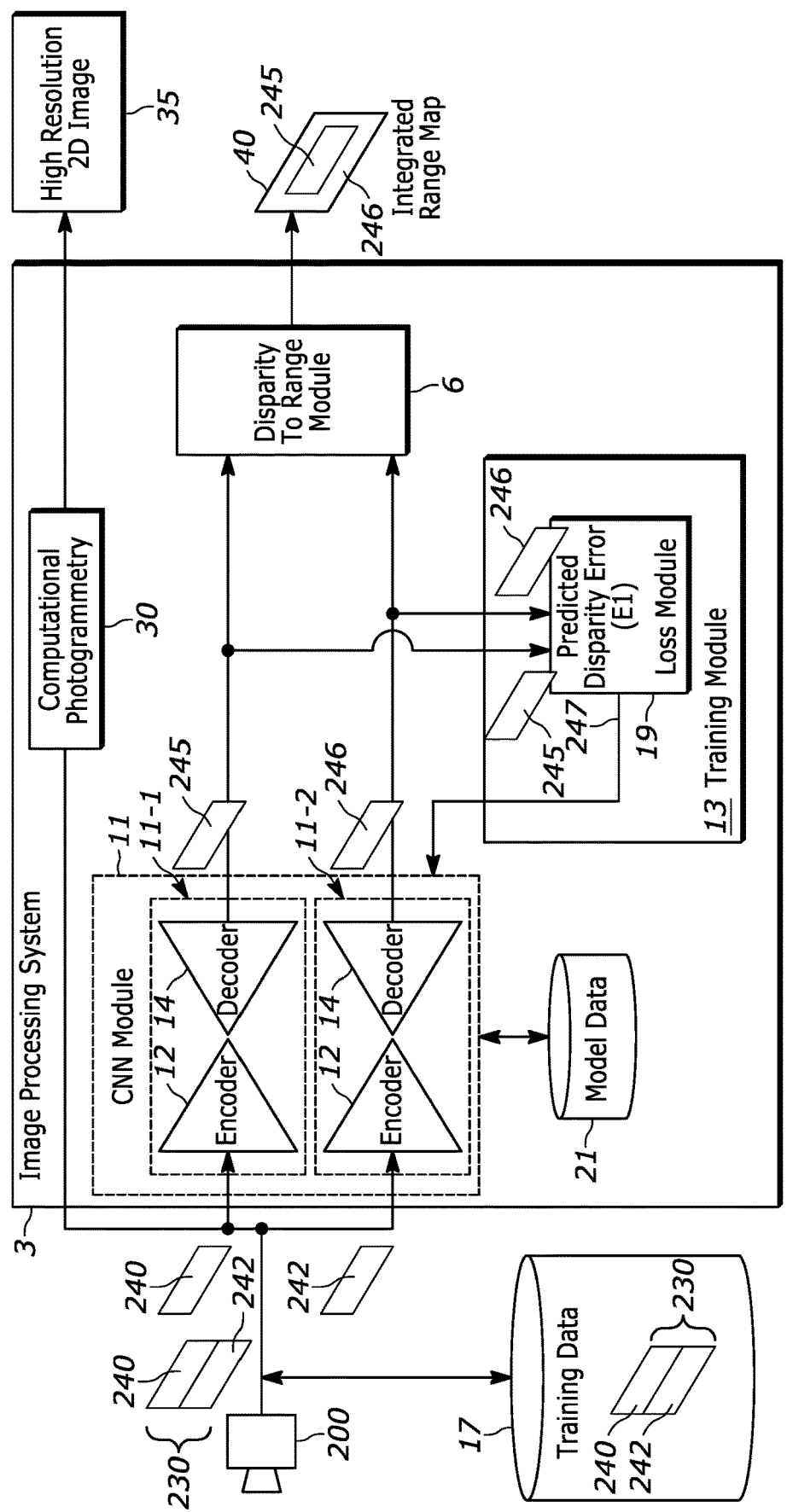
FIG. 10 is a block diagram of an example system for predicting and processing range data from a multi-aperture image set that includes two subaperture images where the magnification of one subaperture image is greater than that of the other subaperture image.

FIG. 10 is a block diagram of an example system for predicting and processing range data from a multi-aperture image set 230 that includes, for example, two subaperture images (e.g., subaperture images 240 and 242 as shown in FIG. 9) where the magnification of subaperture image 240 is greater than that of subaperture image 242. In the example of FIG. 10, the system includes an image processing system 3 having a CNN module 11 with subnetworks 11-1 and 11-2 for each subaperture image captured from the camera system 200 such as the camera described with reference to FIG. 7. In an embodiment, the multi-aperture image set 230 and/or subaperture images 240 and 242 may be annotated with metadata defining the respective images and camera system 200 that captured the images. In the embodiment of FIG. 10, each subnetwork 11-1 and 11-2 of the CNN module 11 includes an encoder 12 having nodes and layers configured to process input subaperture image sets and output encoded data indicative of objects or features in images of the subaperture image sets and a decoder 14 having nodes and layers to predict disparity and to output a predicted disparity map 245 and 246, respectively. Using a CNN module to predict a disparity map is known in the field and described, for example, by Zhao et al., *Monocular Depth Estimation Based on Deep Learning: An Overview*, Jul. 3, 2020, (https://arxiv.org/pdf/2003.06620.pdf) and by Tang et al., *An Unsupervised Monocular Image Depth Prediction Algorithm Based on Multiple Loss Deep Learning*, Nov. 18, 2019, (https://ieeexplore.ieee.org/stamp/stamp.jsp?arnumber=8889754), which are incorporated by reference herein.

In the embodiment of FIG. 10, the predicted disparity map 245 is referred to as a high-resolution predicted disparity map and the predicted disparity map 246 is referred to as a low-resolution predicted disparity map. The high and low resolution predicted disparity maps 245 and 246, respectively, are output from the respective subnetworks, 11-1 and 11-2, of the CNN module 11 to a disparity-to-range module 6 that is configured to generate an integrated range map 40 from the predicted disparity maps 245 and 246. In an embodiment, the subnetwork 11-1 of the CNN module 11 predicts disparity values from the higher magnification subaperture image 240 and generates the high-resolution disparity map 245 and the subnetwork 11-2 of the CNN module 11 predicts disparity values from lower magnification subaperture image 242 and generates the low-resolution predicted disparity map 246, where disparity values of the disparity maps are representative of the intra-image differences in position of detected objects or features within the respective subaperture image. That is, the high-resolution predicted disparity map 245 is predicted from the subaperture image 240 by the subnetwork 11-1 and is representative of disparity of objects captured in the subaperture image 240 and the low-resolution predicted disparity map 246 is predicted from the subaperture image 242 by the subnetwork 11-2 and is representative of disparity of objects captured in the subaperture image 242.

In an embodiment, disparity refers to the difference in location of an object or feature in two corresponding images (e.g., the left and right images as seen by the left and right eyes of a person) that is created due to parallax (e.g., the horizontal separation of the left and right eyes), and a disparity map includes data representative of pixel shift displacement for common points between two images, which are generated from two different perspectives, that result from the angular light path differences induced by the two different perspectives. In an embodiment, a predicted disparity map includes a map of disparity information that is predicted from a single image (e.g., a monocular image). For example, the predicted disparity map includes disparity information that is predicted by a trained CNN module. In an embodiment, for each image input to the CNN module 11, the CNN module produces a predicted disparity map that tries to emulate the disparity map that would result from an imaging system capable of producing disparity, such as a stereoscopic imaging system, a multi-view imaging system, or a temporal imaging system that compares images taken at different time. Two-dimensional images and their corresponding disparity maps can be used to calculate range information. Techniques for predicting disparity maps from a single image are known in the field of monocular depth estimation and techniques for calculating range information from disparity maps are known in the field of image-based ranging. For example, a disparity map (including a predicted disparity map) can be inverted to get depth information.

In an embodiment, the disparity-to-range module 6 is configured to compute range information from the predicted disparity maps 245 and 246 that are output by the CNN module 11. In an embodiment, the disparity-to-range module 6 generates the integrated range map 40, which is generated from both the high-resolution predicted disparity map 245 and the low-resolution predicted disparity map 246. In an embodiment, the integrated range map 40 includes an array of range information that corresponds to the multi-aperture image set 230 and that is generated in part by overlaying common points (e.g., areas of common objects and/or features) in both the high-resolution predicted disparity map 245 and the low-resolution predicted disparity map 246. Since subaperture image 240 is captured at a higher magnification than the subaperture image 242, the high-resolution predicted disparity map 245 will overlap with only a portion of the low-resolution predicted disparity map 246 as illustrated in FIG. 10.

As illustrated in FIG. 10, the image processing system 3 also includes a computational photogrammetry module 30 that is configured to generate a high-resolution two-dimensional image 35 from the multi-aperture image set 230. In an embodiment, high resolution 2D images 35 are generated and output in a video stream as is known in the field.

In an embodiment, the CNN module 11 includes a dynamic structured arrangement of processing nodes, with each node having a corresponding weight parameter. In an embodiment, the structure and weights utilized within the CNN module 11 are updated in response to feedback from a training module 13, which may be implemented, for example, during a training stage. In an embodiment, a loss module 19 receives the high-resolution predicted disparity map 245 and the low-resolution predicted disparity map 246, which are generated from the multi-aperture image set 230, from the subnetworks, 11-1 and 11-2, of the CNN module 11 and calculates a disparity error ($E_1$) that represents the difference between common points in the high-resolution predicted disparity map 245 and the low-resolution predicted disparity map 246. In an embodiment, the high-resolution predicted disparity map 245 is considered as a reference disparity map for disparity map 246 because it has been realized that the high-resolution predicted disparity map 245 includes disparity information that can be relied on to produce accurate range information for objects or features in the corresponding subaperture image 240. In another embodiment, the low-resolution disparity map 246 can be considered as a reference for the high-resolution disparity map 245 when subaperture image 242 captures an object that fills the entire image. The error between common points in the disparity maps (e.g., the high-resolution predicted disparity map 245 and the low-resolution predicted disparity map 246) is fed back to the CNN module as a predicted disparity error 247. In an embodiment, the predicted disparity error 247 is used to train the CNN module 11. For example, the predicted disparity error 247 can be used to train the subnetwork 11-2 of the CNN module 11 to better predict disparity in regions of the subaperture image 242 (e.g., the subaperture image that has a wider field of view but lower magnification/resolution) and/or to train the subnetwork 11-1 of the CNN module 11 to predict disparity for close objects in the regions of the subaperture image 240. In another embodiment, the predicted disparity error 247 can be used to train either one of the subnetworks, e.g., only subnetwork 11-1 or only subnetwork 11-2.

In an embodiment, the loss module 19 is configured to calculate an error (e.g., predicted disparity error) between a predicted disparity map and a reference disparity map. For example, the training module 13 feeds the predicted disparity error 247 to the CNN module 11 and the CNN module is trained by adjusting the weights of the CNN module. As a result, CNN module 11 is optimized to accurately and efficiently generate the disparity map 246 directly from the subaperture images (e.g., from the low-resolution subaperture image 242) of the multi-aperture image set 230. In an embodiment, a model or models that are implemented by the CNN module 11 are stored as model data 21.

In an embodiment, the image processing system 3 can be fed by training data 17 that is stored externally to the image processing system 3. For example, the training data 17 may include multi-aperture image sets 230 that include high-resolution subaperture images 240 and low-resolution subaperture images (242), e.g., subaperture images captured at different magnifications.

Figure 11:
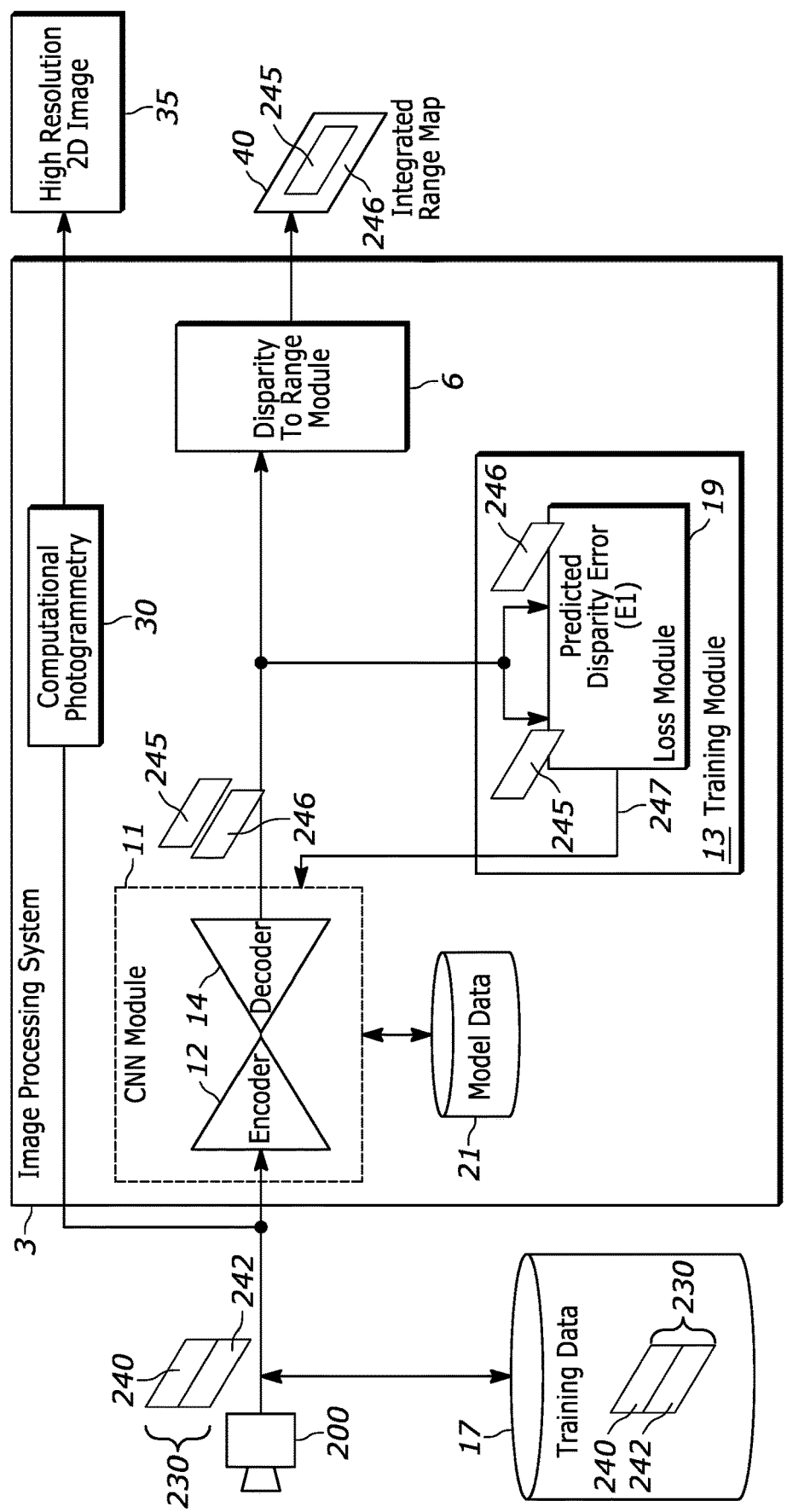
FIG. 11 is a block diagram of another example system for predicting and processing range data from a multi-aperture image set that includes two subaperture images where the magnification of one subaperture image is greater than that of the other subaperture image.

In the embodiment of FIG. 10, the CNN module 11 includes subnetworks, 11-1 and 11-2, that are tuned specifically to make disparity predictions for either the high-resolution subaperture image 240 or the low-resolution subaperture image 242. In another embodiment, the CNN module is configured with a single neural network that is tuned to make disparity predictions from both the high-resolution subaperture image 240 and the low-resolution subaperture image 242. FIG. 11 is a block diagram of an example system for predicting and processing range data from a multi-aperture image set 230 that includes, for example, two subaperture images (e.g., subaperture images 240 and 242 as shown in FIG. 9) where the magnification of subaperture image 240 is greater than that of subaperture image 242. In the example of FIG. 11, the system includes an image processing system 3 having a CNN module 11 with a single encoder 12 and decoder 14. The CNN module 11 receives the high-resolution subaperture image 240 and the low-resolution subaperture image 242 of the multi-aperture image set 230 arranged as a two-channel image and predicts both the high-resolution predicted disparity map 245 and the low-resolution predicted disparity map 246. The loss module 19 receives the high-resolution predicted disparity map 245 and the low-resolution predicted disparity map 246 from the CNN module 11 and calculates a disparity error ($E_1$) that represents the difference between common points in the high-resolution predicted disparity map 245 and the low-resolution predicted disparity map 246. In an embodiment, the disparity maps 245 and 246 are considered as a reference for each other as both disparity maps cannot have different predictions for the overlapping region between 240 and 242. The error between common points in the disparity maps (e.g., the high-resolution predicted disparity map 245 and the low-resolution predicted disparity map 246) is fed back to the CNN module 11 as a predicted disparity error 247. In an embodiment, the predicted disparity error 247 is used to train the CNN module 11. For example, the predicted disparity error 247 can be used to train the CNN module 11 to better predict disparity in regions where the high-resolution disparity prediction is available for the same regions of the low-resolution disparity prediction of subaperture images 240 and 242.

An advantage of the described CNN-based ranging technique is that the image processing system 3 can produce reliable and accurate range maps by predicting the full field-of-view disparity maps from lower resolution subaperture images and enforcing the full field-of-view disparity maps to be consistent with predictions resulting from higher resolution subaperture images that overlap with regions of the lower resolution subaperture images. In an embodiment, the training module 13 aims to optimize the accuracy of each predicted disparity map 245 and 246 to its corresponding source input subaperture image 240 and 242. The loss module 19 enforces consistency across predicted disparity maps 245 and 246.

In an embodiment, the neural network is described a CNN although other types of neural network may be possible. In some instances herein, the terms depth and range are used synonymously to mean a distance from the camera to the object(s) and/or features that are captured by the array of sensing elements.

A device is disclosed herein. The device includes a lens, configured to receive an image from the field of view of the lens; a multi-aperture optical element, comprising elements of known dimensions and focal length, optically coupled to the lens and configured to create a multi-aperture image comprising a plurality of subaperture images, whereas at least one point in the field of view is captured by at least two subaperture images of the multi-aperture image; a plurality of sensing elements, the sensing elements being optically coupled to the multi-aperture optical element and configured to generate electrical output signals from the sensing elements based on the subaperture images; a ROIC communicatively coupled to the sensing elements and configured to receive the signals from the sensing elements, convert the signals to digital signals and to output digital data; a neural network, responsive to the ROIC digital outputs from a plurality of the sub-aperture images, which is configured to produce depth and/or disparity signals for a portion of both overlap and non-overlap regions; the neural network trained using a plurality of loss functions where a least one loss function is responsive to a plurality of sub-apertures and directly or indirectly to their disparity. In another embodiment, the neural network is trained using a loss function.

A computer-implemented method is also disclosed. The computer-implemented method involves storing data defining a model to both predict disparity data and compute disparity data from a set of at least two subaperture images of a multi-aperture image; and generating a depth image from the disparity data; generating a predicted disparity map from each input subaperture image using the model; and calculating corresponding estimated depth data from the predicted disparity map and calculating corresponding depth data from the parallax data between the at least two subaperture images, wherein the model was trained on at least two input subaperture images of a multi-aperture image by: calculating disparity in the overlapping region between the at least two subaperture images; and updating the model based on a cost function that enforces consistency between the predicted disparity values and computed disparity values for each subaperture image in the multi-aperture image.

The computer-implemented method may also involve predicting, for each subaperture image, corresponding disparity values that enable reconstruction of another subaperture image when applied to the subaperture image.

In an embodiment of the computer-implemented method, the model was further trained by: computing, for each subaperture image of the multi-aperture image, projected disparity values based on the corresponding disparity values.

In an embodiment of the computer-implemented method, the projected disparity values were computed for one subaperture image of the multi-aperture image by sampling the predicted disparity values of the another subaperture image, and applying the predicted disparity values of the other image to the sampled data.

In an embodiment of the computer-implemented method, the cost function includes a disparity consistency component to enforce consistency between the predicted disparity values and the projected disparity values computed for each image of the subaperture images.

In an embodiment of the computer-implemented method, training the model further involves reconstructing a second subaperture image in the multi-aperture image by applying the corresponding predicted disparity values to shift sampled image pixels of the first subaperture image in the multi-aperture image.

In an embodiment of the computer-implemented method, the statistical model comprises a convolutional neural network, CNN, including a structured arrangement of processing nodes, each processing node having at least one weight value.

In an embodiment, the convolutional neural network is trained by back-propagating components of the cost function.

In an embodiment, training the model further involves: up-sampling and up-convolving the input subaperture images at a plurality of spatial resolutions; and predicting corresponding disparity values at each spatial resolution; wherein the model is updated based on a cost function that enforces consistency between the predicted disparity values at each spatial resolution for each subaperture image in the multi-aperture image.

In an embodiment, the cost function comprises a weighted enforcement of consistency between the predicted disparity values depending on the spatial resolution.

In an embodiment, corresponding depth data is computed from the predicted disparity values.

In an embodiment, the subaperture images are rectified.

In an embodiment, the digital images are annotated with metadata defining attributes of the respective camera that captured the image.

An embodiment of a computer-implemented method is disclosed. The method involves storing data defining a model to predict depth data from subaperture image data, training the model on at least two input subaperture images, by: predicting, for each input subaperture image, corresponding disparity values that enable reconstruction of another image when applied to the image; and updating the model based on a cost function that enforces consistency between the predicted disparity values for each subaperture image in the multi-aperture image, wherein the trained model can be used to generate a depth image from a single input image by: generating a predicted disparity map from the input image using the trained model; and calculating corresponding estimated depth data from the predicted disparity map.

Also disclosed, is a non-transitory computer-readable medium storing instructions that, when executed by a computing device, cause the computing device to perform operations involving storing data defining a model to predict depth data from subaperture image data; and generating a depth image from a single input subaperture image by: generating a predicted disparity map from the input subaperture image using the model; and calculating corresponding estimated depth data from the predicted disparity map, wherein the model was trained on at least two input subaperture images by: predicting, for each image of the input subaperture images, corresponding disparity values that enable reconstruction of another image when applied to the image; and updating the model based on a cost function that enforces consistency between the predicted disparity values for each subaperture image in the multi-aperture image.

In an embodiment, the operations further involve: up-sampling and up-convolving the input subaperture images at a plurality of spatial resolutions; and predicting corresponding disparity values at each spatial resolution; wherein the model is updated based on a cost function that enforces consistency between the predicted disparity values at each spatial resolution for each subaperture image in the multi-aperture image.

A device is also disclosed. The device includes a lens, configured to receive an image from the field of view of the lens; a multi-aperture image collection system optically coupled to the lens and configured to create a multi-aperture image comprising a plurality of subaperture images, whereas at least one point in the field of view is captured by at least two subaperture images of the multi-aperture image; a plurality of sensing elements, the sensing elements being optically coupled to the multi-aperture image collection system and configured to generate electrical output signals from the sensing elements based on the subaperture images; a read-out integrated circuit (ROIC) communicatively coupled to the sensing elements and configured to receive the signals from the sensing elements, convert the signals to digital signals and to output digital data; a neural network, responsive to the ROIC digital outputs from a plurality of the sub-aperture images, which is configured to produce depth and/or disparity signals for a portion of both overlap and non-overlap regions; said neural network trained using a plurality of loss functions where a least one loss function is responsive to a plurality of sub-apertures and directly or indirectly to their disparity. In an embodiment, the neural network is trained using a loss function.

Although the operations of the method(s) described herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or non-transitory computer-readable medium providing computer executable instructions, or program code, for use by or in connection with a computer or any instruction execution system. For the purposes of this description, a non-transitory computer-usable or computer readable medium can be any apparatus that can contain or store the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

In an embodiment, the above-described functionality is performed at least in part by a computer or computers, which executes computer readable instructions. In an embodiment, the computer may include a processor, memory, and a communications interface. The processor may include a multifunction processor and/or an application-specific processor. Examples of processors include the PowerPC™ family of processors by IBM and the x86 family of processors by Intel such as the Xeon™ family of processors and the Intel X5650 processor and Graphical Processor Units (GPUs) such as manufactured by NVIDIA and Qualcomm. The memory within the computer may include, for example, storage medium such as read only memory (ROM), flash memory, RAM, and a large capacity permanent storage device such as a hard disk drive. The communications interface enables communications with other components of a computer system or with other computers via, for example, a communications bus and/or the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An image processing system comprising:
   at least one processor and memory configured to;
   receive a multi-aperture image set that includes a high-resolution subaperture image and a low-resolution subaperture image, wherein the high-resolution subaperture image and the low-resolution subaperture image were captured simultaneously from a camera using dissimilar focal lengths, which results in dissimilar magnification, and wherein the low-resolution subaperture image was captured at a lower magnification than the high-resolution subaperture image;
   predict a high-resolution predicted disparity map from the high-resolution subaperture image using a neural network;
   predict a low-resolution predicted disparity map from the low-resolution subaperture image using the neural network;
   generate an integrated range map from the high-resolution predicted disparity map and the low-resolution predicted disparity map, wherein the integrated range map includes an array of range information that corresponds to the multi-aperture image set and that is generated by overlaying common points in both the high-resolution predicted disparity map and the low-resolution predicted disparity map.

2. The image processing system of claim 1, wherein the high-resolution predicted disparity map overlaps with only a portion of the low-resolution predicted disparity map in the integrated range map.

3. The image processing system of claim 1, wherein the high-resolution subaperture image and the low-resolution subaperture image are captured simultaneously in two rectangles stacked on top of each other.

4. The image processing system of claim 1, wherein the neural network is trained based on a cost function that enforces consistency between the high-resolution predicted disparity map and the low-resolution predicted disparity map.

5. The image processing system of claim 4, wherein the cost function includes a disparity consistency component to enforce consistency across the high-resolution predicted disparity map and the low-resolution predicted disparity map.

6. The image processing system of claim 1, wherein the neural network implements a model or models that are stored as model data in the memory.

7. The image processing system of claim 1, wherein the at least one processor and memory are further configured to:
generate a predicted disparity error that corresponds to a difference in predicted disparity between common points between the high-resolution predicted disparity map and the low-resolution predicted disparity map; and
train the neural network using the predicted disparity error.

8. The image processing system of claim 7, wherein the high-resolution predicted disparity map is used as a reference to generate the predicted disparity error, and the predicted disparity error is used to train a portion of the neural network that predicts low-resolution predicted disparity maps from low-resolution subaperture images.

9. The image processing system of claim 7, wherein the low-resolution predicted disparity map is used as a reference to generate the predicted disparity error, and the predicted disparity error is used to train a portion of the neural network that predicts high-resolution disparity maps from high-resolution subaperture images.

10. The image processing system of claim 7, wherein the predicted disparity error is used to train a portion of the neural network that predicts disparity maps from subaperture images captured at the lower magnification.

11. The image processing system of claim 7, wherein the predicted disparity error is used to train a portion of the neural network that predicts disparity maps from subaperture images captured at the higher magnification.

12. A computer implemented method comprising:
receiving a multi-aperture image set that includes a high-resolution subaperture image and a low-resolution subaperture image, wherein the high-resolution subaperture image and the low-resolution subaperture image were captured simultaneously from a camera using dissimilar focal lengths, which results in dissimilar magnification, and wherein the low-resolution subaperture image was captured at a lower magnification than the high-resolution subaperture image;
predicting a high-resolution predicted disparity map from the high-resolution subaperture image using a neural network;
predicting a low-resolution predicted disparity map from the low-resolution subaperture image using the neural network; and
generating an integrated range map from the high-resolution predicted disparity map and the low-resolution predicted disparity map, wherein the integrated range map includes an array of range information that corresponds to the multi-aperture image set and that is generated by overlaying common points in both the high-resolution predicted disparity map and the low-resolution predicted disparity map.

13. The computer implemented method of claim 12, wherein the neural network is trained based on a cost function that enforces consistency between the high-resolution predicted disparity map and the low-resolution predicted disparity map.

14. An image processing system comprising:
a neural network configured to;
receive a multi-aperture image set that includes a high-resolution subaperture image and a low-resolution subaperture image, wherein the high-resolution subaperture image and the low-resolution subaperture image were captured simultaneously from a camera using dissimilar focal lengths, which results in dissimilar magnification, and wherein the low-resolution subaperture image was captured at a lower magnification than the high-resolution subaperture image;
predict a high-resolution predicted disparity map from the high-resolution subaperture image;
predict a low-resolution predicted disparity map from the low-resolution subaperture image; and
a disparity-to-range module configured to generate an integrated range map from the high-resolution predicted disparity map and the low-resolution predicted disparity map, wherein the integrated range map includes an array of range information that corresponds to the multi-aperture image set and that is generated by overlaying common points in both the high-resolution predicted disparity map and the low-resolution predicted disparity map.

15. The image processing system of claim 14, wherein the neural network is trained based on a cost function that enforces consistency between the high-resolution predicted disparity map and the low-resolution predicted disparity map.

16. The image processing system of claim 15, wherein the neural network implements a model or models that are stored as model data in a memory.

* * * * *